GATED CIRCUIT FOR PRODUCING OSCILLATORY WAVE FORM ACROSS CAPACITOR HAVING TWICE THE PRESELECTED GATING FREQUENCY

Filed Feb. 26, 1965 2 Sheets-Sheet 1

INVENTORS
CONNOR F. HAUGH
GEORGE A. HELLWARTH

BY W. G. Roberts

ATTORNEY

United States Patent Office 3,360,732
Patented Dec. 26, 1967

3,360,732
GATED CIRCUIT FOR PRODUCING OSCILLATORY WAVEFORM ACROSS CAPACITOR HAVING TWICE THE PRESELECTED GATING FREQUENCY

Connor F. Haugh, Poughkeepsie, and George A. Hellwarth, Baldwin, N.Y., assignors to International Business Machines Corporation, Armonk, N.Y., a corporation of New York Filed Feb. 26, 1965, Ser. No. 435,483
10 Claims. (Cl. 328—223)

ABSTRACT OF THE DISCLOSURE

A reactive load device that is to be excited by a polarity varying voltage representing binary data is connected with a conjugate reactance to form a circuit that is resonant at twice the data frequency. One bidirectional switch connects the resonant circuit to a source of one polarity for a full cycle at the resonant frequency and another switch connects the resonant circuit to a source of opposite polarity for a subsequent full cycle. The voltage sources offset the oscillatory voltage such that each full cycle is biased to have a single polarity. A data cycle is made up of a resonant frequency cycle offset for a positive polarity and a resonant frequency cycle offset for a negative polarity. The order of the cycles signifies a binary digit.

This invention relates generally to an electrical circuit for producing a polarity varying voltage across a load. In a specific application the invention relates to a circuit for producing a voltage to modulate a light beam to transmit binary data.

Some crystals have the property of rotating the plane of polarization of light that they transmit when a voltage is applied to two electrodes attached to the crystal. The plane of polarizaion is rotated in one direction for one polarity of voltage and is rotated in the other direction for the other polarity. The prior art has suggested modulating the plane of polarization of a light beam to represent binary data; such a light beam can be demodulated at a receiving station by apparatus that includes polarizing filters and light sensitive devices.

This invention is particularly concerned with a circuit for producing a modulating voltage across the terminals of such a crystal. There are several well known general purpose circuits for energizing a polarity varying load from a direct voltage source and a short explanation of these circuits will help in understanding the details of the circuit of this invention and particular problems that it is intended to overcome. Some of these circuits comprise a bridge in which a center tapped power supply forms two adjacent legs, two switches form the other two legs, and a load is connected in the diagonal between the center tap of the power supply and the common connection of the two switches. The switches are operable to connect the load alternately to the opposite polarity ends of the power supply. In other bridge circuits the two switches form two adjacent legs, two sections of a center tapped transformer winding form the other two legs of the bridge and the power supply is connected in the diagonal between the connection of the two switches and the center tap of the winding. The switches operate to apply opposite polarities alternately to the ends of the winding to produce an alternating polarity voltage across the winding. A general object of this invention is to provide a new and improved circuit for energizing an alternating voltage load from a direct voltage source.

A more specific object of this invention is to provide a new and improved direct-to-alternating voltage converter that is particularly suited to the requirements of a polarization modulating crystal. One of the problems in providing such a circuit is that the crystal requires considerable power and a high voltage, a few thousand volts. A more specific object of this invention is to provide a circuit in which the switching occurs at voltage zeros; this feature is an advantage over most bridge circuits of the type having transformer windings which produce reactive voltages. Another specific object is to provide a circuit with low power consumption.

In one embodiment the circuit of this invention includes a novel bridge circuit having a power supply and a switch connected in each of two legs and having two inductively coupled windings connected in the opposite two legs; a capacitive load (the crystal) is connected across the diagonal so that the load is common to two circuit loops each having a power supply, a switch, and an inductor. The switches are operable to supply power to the capacitor in the polarity established by the switch and to the winding of the associated loop. Within a loop the capacitor and winding section form a circuit that is resonant at the switching frequency.

One feature of this circuit is that the voltage across the capacitor is about four times the voltage of a single power supply; the center tap feature of the power supply divides the voltage with respect to ground by a factor of two and the resonant circuit arrangement gives the capacitor twice the voltage in one polarity that the source applies to the circuit of the capacitor and one of the two winding sections.

The detailed description of the invention will explain these advantages and objects more fully and will suggest other goals for an optical communications system and corresponding features and advantages of the circuit of this invention.

*The drawing*

Figure 1:
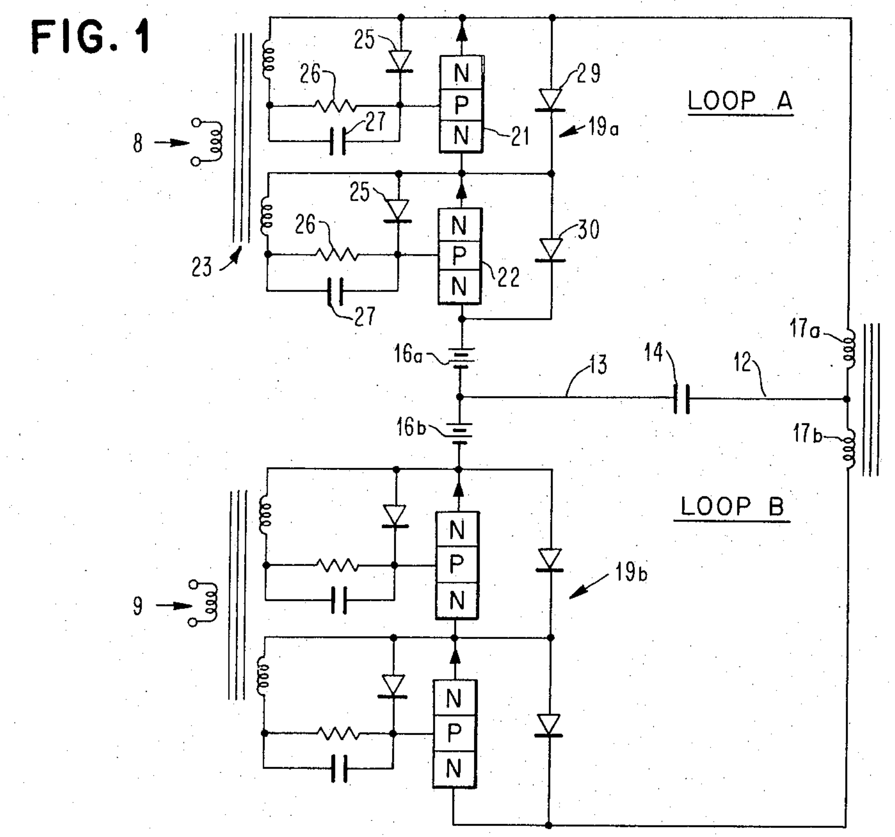
FIG. 1 is a schematic of one embodiment of the circuit of this invention.

*The circuit of FIG. 1*

The circuit of FIG. 1 receives binary data at two pairs of input terminals 8 and 9 and produces an oscillatory output wave form across the terminals 12 and 13 of a load 14 shown schematically as a capacitor. FIG. 2A represents a data sequence 0, 1, 1, 0, 1 that will be used as an example of the operation of the circuit. For each bit of input data a pulse is applied to first one input 8 or 9 and then the other as FIGS. 2A, B and C show. The sequence 8 and 9 represents a one and the sequence 9 and 8 represents a zero. For each data bit the oscillatory signal at the output terminals 12 and 13 data is given a positive half cycle and a negattive half cycle. The sequence positive-negative represents a logical zero and the sequence negative-positive represents a logical one. When the voltage wave form of FIG. 2E is applied to a suitable crystal it rotates the plane of light it transmits.

In the circuit of FIG. 1 the capacitor 14 couples two circuit loops that are similar except for their arrangement to provide opposite polarity voltages across capacitor 14. Corresponding components will be identified collectively by the same number and will be distinguished where appropriate by letter suffixes *a* and *b* for the two loops. Each loop of the circuit of FIG. 1 comprises a power supply 16 having one terminal connected to terminal 13 of capacitor 14, an inductive winding 17 having one end connected to the other terminal 12 of the capacitor, and a switch 19 that responds to a signal at the associated input terminals 8 or 9 to connect the power supply 16 to energize the circuit of the associated winding 17 and the capacitor 14.

The two sections of the power supply and the two switches 19 are arranged to apply opposite polarity voltages to capacitor 14 to produce the voltage wave form illustrated by FIG. 4E. This operation and structural details of the circuit of FIG. 1 will be presented in the following sequence: first the structural details of the switch, then the operation of one loop in response to the input pulses, and finally the operation when one and then the other of the two inputs 8 and 9 are energized.

Each switch 19 is constructed of electronic devices that are appropriate for the current supplied to the load circuit and for the voltage of the associated source 16 and reactive voltages produced in the load circuit (described later). FIG. 1 illustrates a series connection of transistors for the case in which the current is within the rating of the single transistor but the circuit voltages are higher than the voltage rating of an individual transistor. Switch 19*a*, numbered in detail in FIG. 1, comprises two transistors 21, 22 connected to conduct in series between a terminal of the associated source 16*a* and one end of winding section 17*a*. Each transistor 21, 22 has its base and emitter terminals coupled to receive a signal at input terminals 8 by means of a circuit that includes a transformer 23, a diode 25 connected across the base and emitter terminals of each transistor to protect the base-emitter junction from reverse voltages developed in the circuit, and a resistor 26 and a capacitor 27 connected to develop a voltage (shown in FIGS. 2B and C) tending to turn off the transistor in the interval between input pulses. Switch 19*a* also has diodes 29 and 30 connected across the emitter and collector terminals of transistors 21, 22 to conduct reactive current as will be explained later. The illustrated switches 19 are conventional and they have been described in detail only to illustrate features to be considered in selecting an appropriate switch design.

Figure 2:
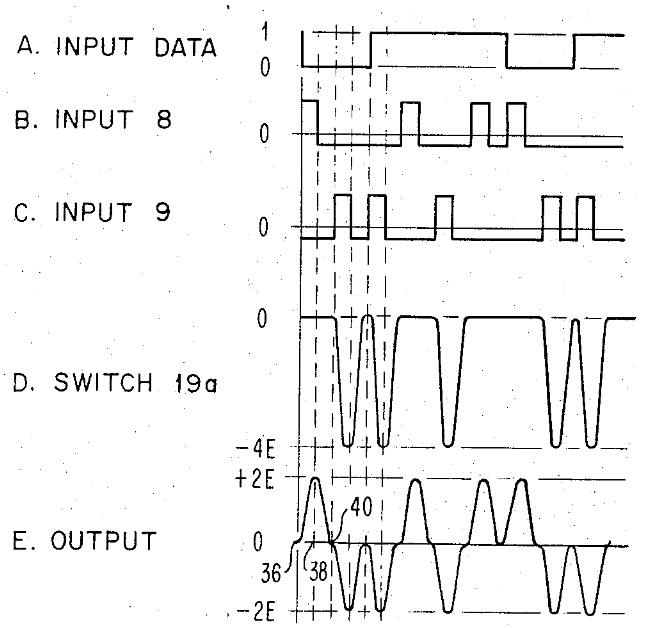
FIG. 2 is a series of wave forms associated with points in the circuit of FIG. 1.
Figure 3:
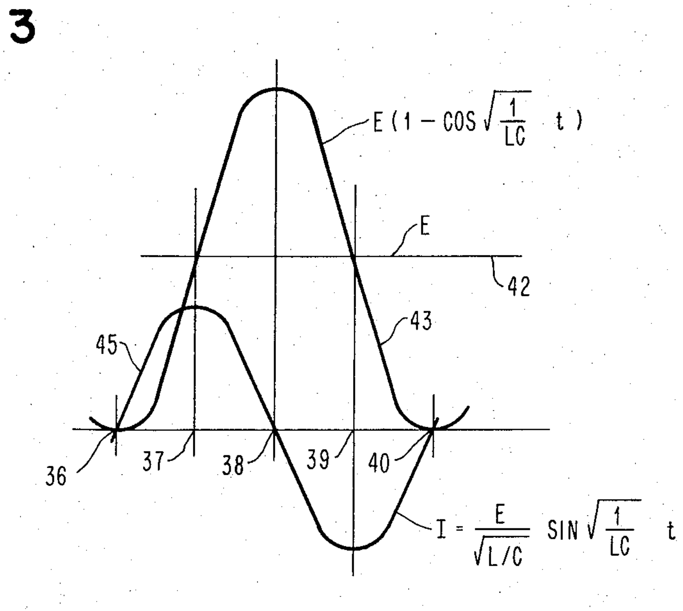
FIG. 3 shows part of FIG. 2 in more detail.

The output wave form of FIG. 2E has the data frequency in the sense that a positive pulse and a negative pulse are formed during each data period. The circuit of capacitor 14 and one winding 17*a* or 17*b* are made resonant at twice the data frequency and FIG. 3 shows how components of the resonant frequency are made to form the first positive pulse of FIG. 2E. (Capacitor 14 represents schematically the distributed capacitance in either of its loops in addition to the discrete capacitance of a capacitor or an optical crystal; similarly each winding 17*a* and 17*b* represents a discrete inductor plus any distributed inductance.)

In FIG. 3 points 36 through 40 identify the beginning and end of each quarter cycle of the resonant frequency. Points 36, 38 and 40 are also shown in FIG. 2E. When switch 19*a* is closed at point 36 in FIG. 2, loop A forms a circuit comprising source 16*a* of value E and a series LC combination. The voltage and current of the capacitor can be described by the following equations:

$$Vc=E\left(1-\cos\sqrt{\frac{1}{LC}}\,t\right) \quad (1)$$

$$I=\frac{E}{\sqrt{L/C}}\sin\sqrt{\frac{1}{LC}}\,t \quad (2)$$

In FIG. 3 the time invariant component E of the capacitor voltage is shown by a horizontal line 42 about which the negative cosinusoid 43 is symmetrical. The current is illustrated by a sinusoid 45.

The operation expressed by Equations 1 and 2 can be understood by considering the wave forms of FIG. 3 piecewise.

Switch 19*a* is closed throughout the interval 36 to 40 in FIGS. 2E and 3. Transistors 21 and 22 are turned on at point 36 and conduct, as the positive half cycle of current wave form 45 shows, to charge capacitor 14 in a clockwise direction in loop A. As the current increases during the first quarter of the resonant period, 36 to 37, coil 17*a* acts as a load and receives energy from source 16*a*. At point 37 when the rate of change of current is zero, winding 17 has a zero voltage and the capacitor voltage 43 equals the source voltage 42. As the current decreases between points 37 and 38, winding 17*a* acts as a voltage source and cooperates with source 16*a* to charge capacitor 14 to twice the source voltage at point 38. At point 38 transistors 29, 30 turn off in response to the trailing edge of the pulse of FIG. 2B and the voltage of capacitor 14 and source 16*a* appear (in opposition) across winding 17 and diodes 29 and 30 which turn on and conduct as the negative half cycle of current sinusoid 45 represents. At point 39 the voltage of capacitor 14 again equals the voltage of source 16*a*. Between points 39 and 40 winding 17*a* acts as a voltage source and charges capacitor 14 in opposition to source 16*a*.

Because the circuit has resistive losses that have not yet been discussed, a portion of the voltage of source 16*a* appears across capacitor 14 when the capacitor current is zero at point 40. The resistances are made low enough that this voltage does not prevent interpreting the data represented by the wave form. Thus the resonant cycle begins and ends at points of zero current and approximately zero voltage, and the circuit will respond identically to a subsequent pulse at either input 8 or 9 except for the polarities of the wave forms that the circuit produces.

At the end of a full cycle of the resonant frequency, winding 17*a* has a voltage equal to the voltage of source 16*a* (except for any charge left on capacitor 14) and opposite in polarity. After diodes 29, 30 turn off, winding 17*a* tends to retain this voltage as a charge on its stray capacitance. Windings 17*a*, 17*b* are provided with inductive coupling to prevent a winding from oscillating with its stray capacitance when its associated switch 19 is opened. By transformer action the non-operating winding is given a voltage approximately equal and opposite to the operating winding. Thus for each cycle of the resonant frequency either loop begins with the same initial conditions; the voltage across the winding is opposite in polarity and approximately equal in magnitude to the voltage of source 16. Thus the switches 19 open and close with zero voltage and zero current.

FIG. 2D shows the voltage wave form across switch 19*a*. During the first half cycle of the data frequency while switch 19*a* is closed, the voltage is zero. During the next half cycle while switch 19*a* is open the forward voltage across the switch rises to a peak of about 4 times the source voltage. This voltage is made up of the voltage of source 16*a* which is in the forward switch direction, the capacitor voltage which at point 38 is about twice the source voltage and is in the reverse switch direction in the active loop and in the forward direction in the inactive loop, and the winding voltage which about equals the source voltage and is in the forward direction in both loops. Switches 19 are constructed to remain non-conductive under this voltage.

*Other embodiments*

Figure 4:
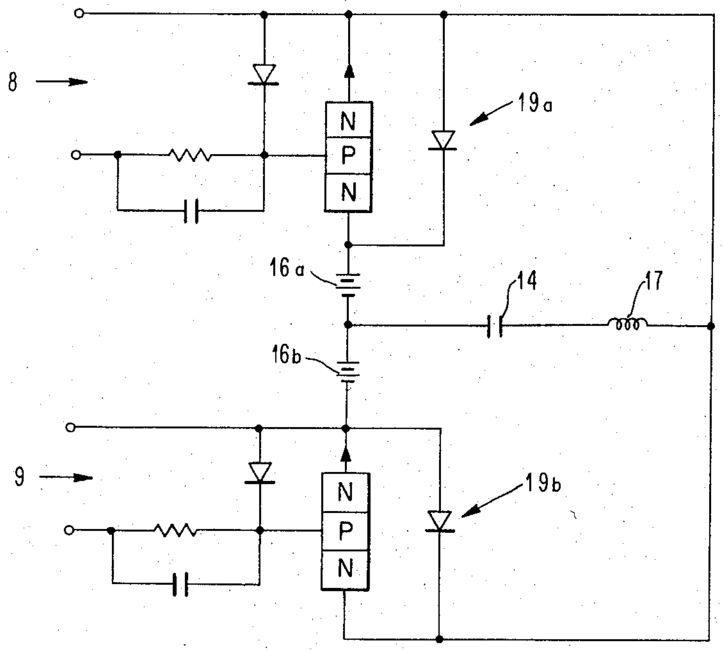
FIG. 4 illustrates a second embodiment of the circuit of this invention.

FIG. 4 shows a second embodiment of the invention. It is generally similar to FIG. 1 but has some differences that illustrate the generality of the specific description of the circuit of FIG. 1. Corresponding components have the same identifying numbers in both FIGS. 1 and 4.

The circuit of FIG. 4 is like the circuit of FIG. 1 in having two loops each of which has a source 16 and a switch 19 distinguished in the drawing by letter suffixes *a* and *b*. Each switch 19 is illustrated somewhat schematically by means of a single transistor having its base and emitter terminals coupled to its associated input terminals 8 or 9. A capacitor 14 is connected in a common branch of both loops to be charged according to the wave forms of FIGS. 2E and 3 when switches 19*a* and *b* are operated according to the inputs shown in FIGS. 2B and C.

The circuit of FIG. 4 differs from the circuit of FIG. 1 in having a single winding 17 connected in the common branch of the two loops where the circuit of FIG. 1 has a separate inductor in each branch. As explained in the description of the circuit of FIG. 1 the two windings 17*a* and *b* function independently except for the feature that the inductive coupling keeps the windings in the non-operating loop from oscillating with its stray capacitance. Thus the wave forms of FIGS. 2 and 3 describe FIG. 4 and the operation of the circuit of FIG. 4 is substantially the same as the operation described for the circuit of FIG. 1.

In the circuit of either FIG. 1 or FIG. 4 the capacitor can be coupled to the circuit by means of a transformer; for some applications of this circuit to energize an electro-optic crystal it is desirable to connect a voltage source to bias the crystal to provide a selected relationship between the oscillatory voltage and the degree that the crystal rotates the plane of polarization.

From the single embodiment of the invention described in detail and the suggested variations, those skilled in the art will recognize many applications for the circuit of this invention and appropriate variations within the spirit of the invention and the scope of the claims.

What is claimed is:

1. A circuit for charging a capacitor comprising:

a first and a second bidirectional switch and a first and a second power supply, and an inductor;

said first switch and said first power supply being connected with said capacitor in a first loop to charge said capacitor in one polarity and discharge said capacitor in the opposite polarity;

said second switch and said second power supply being connected with said capacitor in a second loop to charge said capacitor in said opposite polarity and discharge said capacitor in said one polarity;

means for operating said switches alternately at a preselected frequency;

said inductor including connecting means to provide an inductance in each of said loops, said inductance having a value to make each loop resonant at twice said preselected switching frequency.

2. A circuit according to claim 1 in which said inductor comprises a winding having a first terminal connected to a terminal of said capacitor and a second terminal connected to a point of common connection of one of said first components and one of said second components.

3. A circuit according to claim 1 in which said inductor comprises a winding having a mid tap connected to a terminal of said capacitor and dividing said winding into two sections, said winding having end terminals connected to couple one section of said winding in said first loop and the other section of said winding in said second loop.

4. A circuit for charging a capacitor to a selected voltage, comprising:

a first power supply, a first bidirectional switch and a first inductor connected with the capacitor to form a first circuit loop for charging said capacitor in one polarity and discharging said capacitor in the opposite polarity;

a second power supply, a second bidirectional switch and a second inductor connected with said capacitor in a second loop for charging said capacitor in said opposite polarity and discharging said capacitor in said one polarity; and means for operating said switches at a preselected frequency;

said inductors having values for resonance with the capacitor at twice the preselected switching frequency.

5. A circuit according to claim 4 in which said means for operating said switches operates said switches operable alternately within each period of said preselected frequency to represent a data bit according to the sequence in which the switches are operated.

6. A circuit according to claim 5 in which said first and second power supplies are connected to have a common terminal.

7. A circuit for charging a capacitor to a selected voltage, comprising:

a first power supply, a first bidirectional switch, and a first inductor connected with the capacitor to form a first circuit loop for charging said capacitor in one polarity and discharging said capacitor in the opposite polarity;

a second power supply, a second bidirectional switch, and a second inductor connected with said capacitor in a second loop for charging said capacitor in said opposite direction and discharging said capacitor in said one direction;

said inductors having values for resonance with the capacitor at a preselected frequency and being inductively coupled and having equal turns; and means for operating one of said switches during one cycle of said resonant frequency and to operate the other of said switches during the other cycle of said resonant frequency in a data signifying pattern.

8. A circuit according to claim 7 in which each said switch comprises a switch element having a preferred direction of conduction for charging said capacitor from said source and is operable on quarter cycles; and diode means connected to conductor reactive current.

9. A circuit according to claim 8 in which said diode means conducts in series with its associated power supply whereby said capacitor is given a damped oscillatory voltage wave form about the level of said source, the losses being low whereby the valleys of said oscillatory wave form are distinguishable from the peaks and said capacitor has approximately zero voltage and zero current at the beginning, mid point and end of each period of the switching frequency.

10. A circuit according to claim 9 in which said inductors are conductively connected to have a common terminal and are inductively coupled.

References Cited

UNITED STATES PATENTS

| | | | |
|---|---|---|---|
| 2,981,895 | 4/1961 | Koch | 330—13 |
| 3,210,689 | 10/1965 | Burwen | 330—15 |
| 3,239,771 | 3/1966 | Andreatta | 330—15 |
| 3,258,704 | 6/1966 | Wittman | 330—15 |

JOHN S. HEYMAN, *Primary Examiner.*

ARTHUR GAUSS, *Examiner.*